United States Patent [19]
Cunningham

[11] 4,155,590
[45] May 22, 1979

[54] BICYCLE SEAT POST

[76] Inventor: Charles B. Cunningham, 121 Wood La., Fairfax, Calif. 94930

[21] Appl. No.: 856,870

[22] Filed: Dec. 2, 1977

[51] Int. Cl.² .................. B62J 1/00; F16C 11/00
[52] U.S. Cl. .......................... 297/195; 403/87; 403/91
[58] Field of Search .............. 297/195; 403/81, 84, 403/86, 87, 90, 91, 101, 100; 248/299

[56] References Cited

U.S. PATENT DOCUMENTS

| | | | |
|---|---|---|---|
| 540,118 | 5/1895 | Stearns | 403/82 |
| 587,711 | 8/1897 | Decker | 403/82 |
| 607,438 | 7/1898 | Hood | 403/84 |
| 885,535 | 4/1908 | Sherrill | 403/87 |
| 3,145,005 | 8/1964 | Wester | 248/299 X |
| 3,423,089 | 1/1969 | Andis | 248/299 X |
| 3,432,197 | 3/1965 | Albertine et al. | 403/110 |
| 3,992,054 | 11/1976 | Campagnolo | 297/195 |

FOREIGN PATENT DOCUMENTS 877067 4/1953 Fed. Rep. of Germany ........... 248/299

Primary Examiner—Roy D. Frazier
Assistant Examiner—Peter A. Aschenbrenner

Attorney, Agent, or Firm—Owen, Wickersham & Erickson

[57] ABSTRACT

A bicycle seat post for supporting a saddle on a bicycle frame. A tube cap is secured to the upper end of a tube and provides a cylindrical-segment upper surface. There is a generally cylindrical concentric inner surface, and an oversize upward passage through both surfaces. A cylindrical swivel pin is in engagement with the inner surface. The saddle has a rigid frame that is to be clamped between upper and lower clamp members. The lower clamp member has an upper clamping surface and a lower cylindrical-segment surface in engagement with the cylindrical upper surface of the tube cap. The upper clamp member has a lower clamping surface and a threaded vertical opening. The assembly is held together by a single bolt, preferably extending up from the bottom of the tube cap, through a diametric opening in the swivel pin, through an opening through the lower clamp member, and into the threaded opening of the upper clamp member, tightening all the members together and to the saddle. Simple rotational adjustment of the saddle is thereby afforded while retaining the saddle in its proper fore-and-aft alignment. Superior strength and ease of adjustment is also obtained.

12 Claims, 8 Drawing Figures

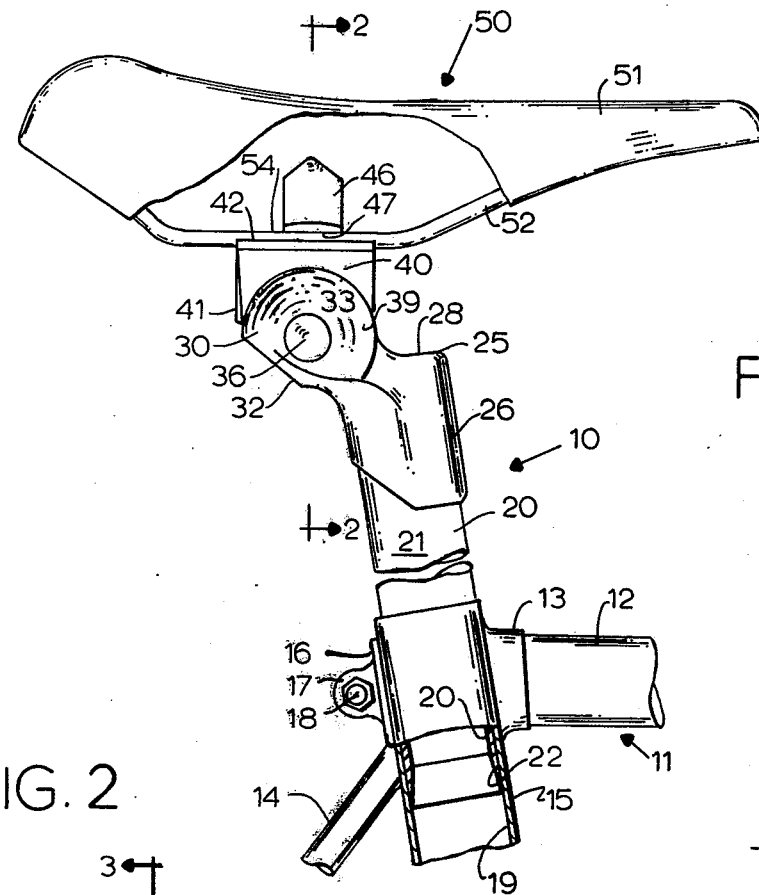
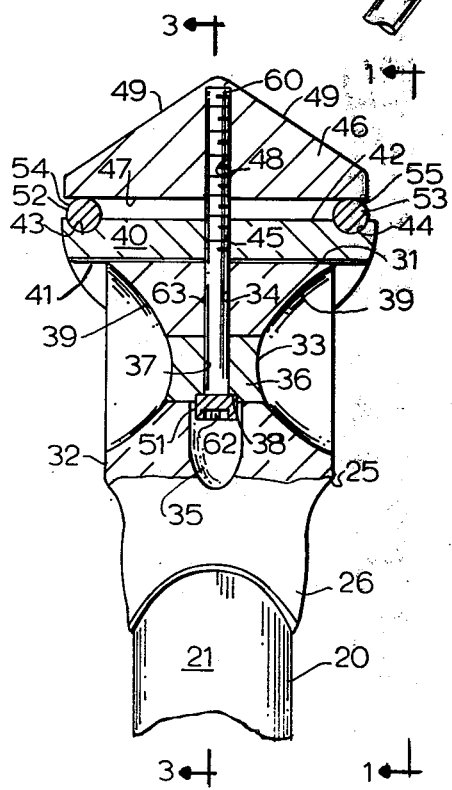
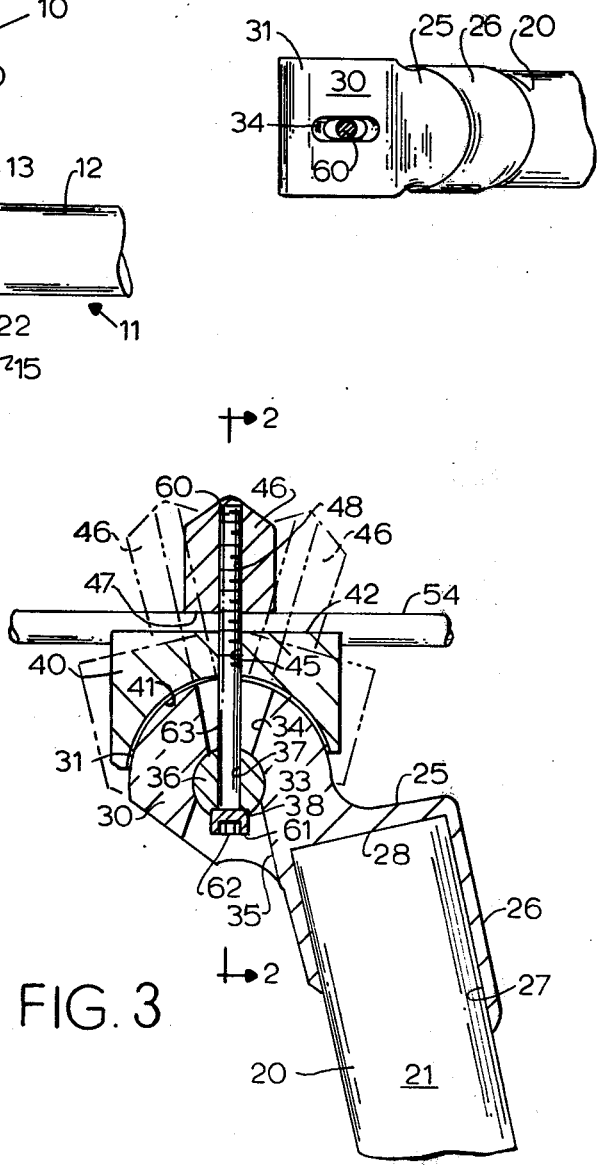
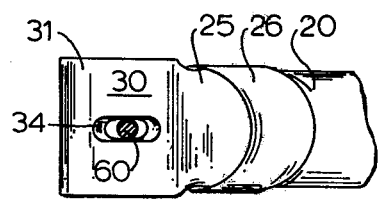
FIG. 1
FIG. 2
FIG. 3
FIG. 4

BICYCLE SEAT POST

BACKGROUND OF THE INVENTION

This invention relates to an improved bicycle seat post for connecting a saddle to a bicycle frame so that the saddle will be held firmly.

The seat post of this invention enables angular adjustment of the saddle fore and aft for optimum positioning of the saddle. It also enables forward and rearward adjustment of the saddle.

Seat posts are almost universally used for the general purpose of securing saddles to bicycle frames. It is generally recognized that such seat posts should permit some adjustment of the seat position of the saddle, for small variations in saddle position can greatly affect the over-all comfort and efficiency of the rider. It is also important that a seat post bought separately from the bicycle be suitable for use with a large number of the many types of bicycle frames that are in use and with most or all of the many types of saddles that are in use.

Heretofore, seat posts have relied for adjustability on two bolts used to secure them to a pair of saddle rails, the tension of one bolt opposing the tension of the other. Angular adjustment has had to be provided by tightening one bolt and loosening the other. However, such systems have been unsatisfactory for a number of reasons:

1. Normal riding loads cause cyclic stretching and contracting of the bolts within their elastic limits, and this cyclic action has frequently resulted ultimately in fatigue failure of the bolts, which tend to crack or break. Structure of this type is generally avoided in aircraft engineering and other fields where high reliability is sought, but not in bicycles. The present invention seeks to overcome this significant problem.

2. Seat posts in use prior to this invention have been very difficult to adjust for obtaining the proper angular position of the saddle. One reason for this difficulty is that the two bolts used in clamping the post to the saddle rails had to be skillfully tightened and loosened relative to each other and in proper opposition to each other in order to obtain the correct angle and the correct final bolt tension, both of which are necessary. The skill was difficult to acquire and difficult to teach to others.

3. Prior-art seat posts have generally located the bolt heads up under the saddle, and this location has made access difficult; so it has been hard to apply a wrench to them and to turn them with proper control.

4. Seat posts prior to this invention have been relatively complex mechanically, and the component parts have been relatively expensive to manufacture.

5. Prior-art seat posts have been unduly heavy. They have been made from heavy metals, partly because their use of two bolts in opposition causes undue strain and is unduly fatiguing even for heavy metals. The weight of these seat posts has thus added significantly to the weight of bicycles which, otherwise have been made quite light in weight, to help the cyclist obtain additional speed, additional endurance, and climb more easily, since the cyclists legs must carry the weight of the bicycle over hills whether or not there are gear-change arrangements.

Thus, among the objects of the invention are: to provide a bicycle seat post which is less liable to suffer breakage or cracking due to metal fatigue; to provide a bicycle seat post which is much easier to adjust for obtaining proper saddle position than has been true in the past; to provide an inherently light bicycle seat post; to provide an inherently strong and durable seat post; to provide a seat post which is relatively inexpensive to manufacture; to provide a simpler seat post with relatively few parts; and to obtain a generally improved seat post which is easier to manufacture, less expensive, and gives superior performance and results in superior comfort to the rider.

SUMMARY OF THE INVENTION

This invention provides a novel lightweight, easily adjustable bicycle seat post for supporting a saddle on a bicycle frame. The post fits into the existing bicycle frames, which have a cylindrical post-receiving socket and some suitable clamp device for securing the seat post to the socket at any of a variety of saddle heights. The saddles have a rigid support device, usually called rails, which, as before, are clamped to the seat post.

The seat post of this invention comprises a cylindrical tube with a tube cap at its upper end providing a transversely-extending cylindrical-segment upper surface, which may be in line with the axis of the tube or may be offset therefrom. The seat post or cap also provides a generally cylindrical inner surface concentric with that upper surface. A centrally located oversize through passage extends upwardly through the center line of these surfaces. A cylindrical swivel pin is in engagement with the inner surface and has a diametric bolt opening therethrough.

Above the tube cap is a lower clamp member having an upper surface for engagement with the lower surface of the saddle rails (or other rigid saddle-support device). This lower clamp member also has a lower cylindrical-segment surface of the same radius as and in engagement with the upper surface of the tube cap, so that relative rotation between these cylindrical surfaces is possible. This lower surface is preferably treated to provide a high-friction, anti-slip surface. A centrally located bolt-receiving opening extends through the lower clamp member, from its lower surface to its upper surface.

An upper clamp member has a lower surface in engagement with an upper surface of the saddle rails and also has a threaded bolt-engaging, generally vertical opening leading up into or through it.

A single bolt is used to tighten the members together. Preferably, the bolt extends up from the bottom of the tube cap, its head at the bottom near the bottom surface of the swivel pin. This bolt extends up through the diametric opening of said swivel pin then up through the cap's passage, through the bolt-receiving opening of the lower clamp member, and into the bolt-engaging threaded opening of the upper clamp member. The bolt tightens the cap, the pin, and the clamp members together and tightens the clamp members to the saddle rails.

The bolt can easily be loosened, to enable adjustment of the seat angle by movement of the lower clamp member relative to the cap, this movement being enabled by the fact that passage through the cap is oversize relative to the bolt—for example, it may be a circumferentially-extending slot or an enlarged conical opening. With the bolt loosened, the saddle rails can be slid fore and aft relative to the clamping members, thereby adjusting the fore-and-aft position of the saddle. The use of the single bolt makes either of these adjustments simple and rapid, and when the head of the bolt is at the bottom and is easily accessible from below, without interferences from the saddle or other parts, the adjustment operations are quite simple. The transverse cylindrical surfaces maintain fore-and-aft alignment of the saddle, once that is set on insertion of the post's tube into the socket of the bicycle frame.

The use of the single bolt, which when tightened is at a constant tension, enables the load variations to be borne by less vulnerable parts of the structure than with a post using a two-bolt system. As a result, the seat post of this invention is inherently more durable than prior-art seating posts and less liable to fatigue failure of the bolt or of any other parts. Moreover, adjustment using the single bolt used in this invention is far easier than with two bolts.

Its relatively small number of parts, its mechanical simplicity, and the easy assembly of all of these parts makes the seat post of this invention much less expensive to manufacture and enables manufacture of a high-quality seat post suitable for mass production.

Furthermore, the invention makes it possible to take full advantage of modern low-density structural materials, including both light metal alloys and high strength plastics. The advantages of these materials are best realized in parts having a relatively bulky section, and the new invention takes full advantage of this characteristic. As a result, the seat post assembly of this invention is lighter than existing seat posts while still having a higher strength relative to weight than they do. Both conventional and unconventional materials can readily be applied to the seat post of this invention.

The adjustable seat post of this invention also provides the needed versatility, being suitable for all bicycle frames and all saddles known to the inventor. It can either be incorporated in a bicycle as part of its original equipment, or it can be easily applied in place of existing equipment.

BRIEF DESCRIPTION OF THE DRAWINGS

In the drawings:

FIG. 1 is a fragmentary view in side elevation, partly broken away and partly in section of a portion of a bicycle frame with its post-receiving socket, a typical saddle, and a seat post assembly embodying the principles of the invention securing the saddle to the frame.

FIG. 2 is a fragmentary enlarged view in section of a portion of FIG. 1 taken through the line 2—2 in FIGS. 1 and 3.

FIG. 3 is a view in section taken along the line 3—3 in FIG. 2. Broken lines indicate extreme positions of rotation of the clamp system and therefore of the saddle relative to the seat post.

FIG. 4 is a top plan view of the tube cap of FIGS. 1-3.

DESCRIPTION OF SOME PREFERRED EMBODIMENTS

Figure 5:
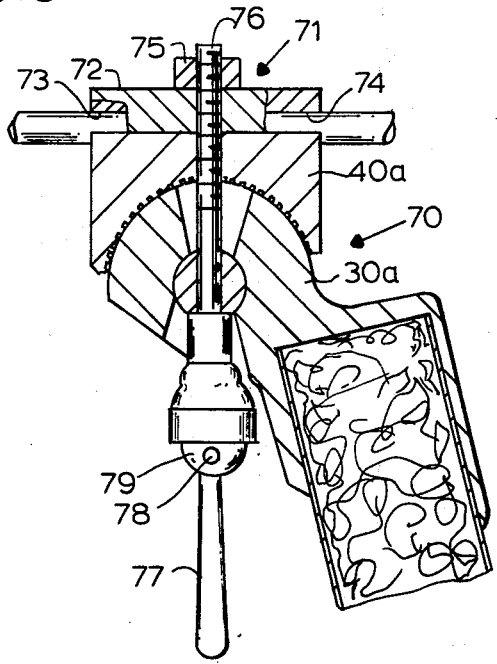
FIG. 5 is a view similar to FIG. 3 (except for the broken line portions), of a modified form of the invention having a built-in adjusting wrench.

The seat post assembly 10 of FIGS. 1-4

A seat post assembly 10 embodying the principles of the invention is shown in FIGS. 1-3. A bicycle frame 11 is shown incompletely in FIG. 1 and includes a top frame tube 12 with a frame lug 13, connected to rear stays 14 in a manner to support a hollow tubular socket member 15, sometimes called a "down tube." The socket member 15 is encircled by a suitable cylindrical clamp 16 having a lug 17 through which a seat post binder bolt 18 extends, the nut either being integral or a separate part on the opposite side from that shown. The socket member 15 has an inner cylindrical surface 19.

Into the socket 15 is inserted a hollow tube 20, which comprises part of the seat post assembly 10 of this invention. The tube 20 is locked in place there by the binder bolt 18 and at any height desired by the rider for proper saddle height. The tube 20 may be made of lightweight alloy or even of a suitably strong plastic and may be given any cross-sectional thickness suitable to the material from which it is made, the strength-to-weight ratio being very high. Its outer surface 21 fits rather snugly inside the inner surface 19 of the socket 15, so that tightening is easy and so that the tube 20 will not slip after it has been clamped in place. The tube 20 may, if desired, be made by extrusion and cutting or in any other suitable manner. A thinned or beveled end portion 22 reduces stress concentration.

The whole cylindrical tube 20 preferably has a wall thickness consistent with the strength of the material chosen for the part, so that it will be as thin as it can be while yet retaining the necessary strength and fatigue resistance. The tube 20 need not, of course, be cylindrical so long as it mates with the frame 11 and meets the desired flexual characteristics.

The upper end 23 of the tube 20 is closed and surmounted by a tube cap 25, which in this instance (see FIGS. 1-3) comprises (1) a tubular portion 26 providing a cylindrical socket 27 fitting around the tube 20 and closing it off with a flat upper end wall 28, and (2) an offset swivel-base portion 30. The portion 30 is provided with a transversely extending cylindrical-segment upper surface 31 offset from the axis of the tube 20 and an inclined lower portion 32. A transverse cylindrical opening 33 through the portion 30 is concentric with the cylindrical surface 30. A slot 34 extends centrally and radially up from the opening 33 and through the surface 31, as a sector widening according to its radial distance from center. A similar slot 35 extends down through the portion 32 in line with the slot 34. The tube cap 30 may be made either as a separate piece joined to the tube 20 (preferably permanently) and in a fixed position or the tube cap 30 and tube 20 can be made as a single integral unit.

A cylindrical swivel pin 36 having a bolt-receiving opening 37 therethrough, is mounted snugly but rotatably in the opening 33. At one end of the opening 37, the end which is to be its lower end, a bolt-head recess 38 may be provided. To reduce weight at locations where less material is needed, the transverse ends of the cap 30 may be relieved, as by a conical recess 39 at each end. The offset of the cap 30 preferably results in the opening 37 being offset backward about 25/32" from the axis of the tube 20.

A lower clamp member 40 rests on top of the offset cap portion 30 and has a lower cylindrical surface 41 in snug engagement with the surface 31. The cylindrical surface 41 has nearly the same radius as the surface 31 so that they mate quite well, and, of course, these mating cylindrical surfaces can rotate relatively to each other but will not move transversely sideways. Rotation, however, should not be possible once the adjustment is made and the bolt is tightened. Therefore the surface 41 or the surface 31 is preferably treated to provide a high-friction surface as by bonding an abrasive to the surface. Also, preferably the arcuate radius of the surface 41 is preferably shorter (as by about 0.003") than that of the surface 31. The friction surface 41 is always concentric with the swivel pin 36.

The lower clamp member 40 may have a generally flat upper surface 42, preferably a pair of rail-receiving recesses 43 and 44, preferably semicylindrical and straight and about one and one-half inches long. A centrally located bolt opening 45 extends through the clamp member 40 and is only very slightly larger in diameter than the bolt therefor. An upper clamp member 46 has a flat lower clamping surface 47. This member 46 also serves as a nut having a threaded opening 48 extending up into it, or through it if desired. The central portion of the upper clamp member 46 is thickest, and it slopes toward each end, as by surfaces 49 (See FIG. 2).

A conventional saddle 50 is shown, having a seat portion 51 supported by two saddle rails 52 and 53, which are typically stiff plated cylindrical rods that are secured rigidly to the seat 51 and having, for mounting or other member purposes two straight portions 54 and 55. These two straight portions 54 and 55 fit into the semicylindrical recesses 43 and 44 of the lower clamp member 40.

The assembly 10 is held together by a single master bolt 60 of commercial high-grade alloy with adequate strength, having a head 61 with a suitable driving means, such as an Allen head 62 or a Phillips head, an hexagonal shape, or even a cross-slotted recess. Its shank 63 extends up fairly snugly through the swivel bolt opening 37, through the slot 34, and through the opening 45 of the lower clamp member 40 and is threaded into the opening 48 of the upper clamp member 46. As shown in FIGS. 3 and 4 the slot 34 gives adequate flexibility for desired rotational positions of the saddle 50 and of the clamps 40 and 46 relatively to the cap 30.

Because of the lower slot 35, the head 61 and recess 62 are readily accessible, so that the bolt 60 can readily be loosened to enable any desired rotational movement within the limits provided by the slot 34 and then immediately tightened to hold the desired position. For example, in a bolt 60 with an Allen head recess 62, a simple Allen-head wrench is inserted for loosening or tightening the bolt 60, and since access is from below there is no interference from the saddle 50. Loosening of the bolt also enables forward and rearward adjustment of the saddle 50 as a whole, relatively to the seat post assembly 10, because the saddle rails 62 and 63 can then be slid either forward or backward in the recesses 43 and 44.

Some or all of the parts can be made from light metal or plastic, such as fiber reinforced resins with metal inserts where high concentrated loadings are anticipated and where they are shown to be necessary. When plastic or soft metal is used, steel thread inserts may be used to prolong the life of the threaded parts. All of the surfaces may be plated or otherwise treated to render them less susceptible to corrosion. This includes the use of colored anodizing treatments for basic attractiveness. Some of the parts can be made from extruded sections of magnesium or aluminum alloys with very little followup machining. Many of the parts can be machined from standard aluminum or magnesium alloy using bar and tube stock. The cap 30 can, if desired, be made as a forged part to be joined to the tube 20, and the other parts may be forgings also, instead of moldings or machined parts.

THE MODIFIED SEAT POST ASSEMBLY 70 OF FIG. 5

A modified assembly 70 shown in FIG. 5 is structurally the same as that shown in FIGS. 1-4 except for a few modifications. Thus, the assembly 70 is shown with an upper clamp member 71 which is a generally flat plate-like member 72 formed to provide a pair of suitable clamping slots 73 and 74 corresponding to slots of 43 and 44 of the lower clamp member 40a, which remains generally the same as the clamp member 40 in FIGS. 1-4. The plate 72 may have a nut 75 welded to it, preferably as by welding or machining, to provide adequate anchorage, although it is possible to employ a loose nut, such as a wing nut.

By way of further illustration of modifications, a bolt is a cam-action threaded quill 76 that is provided with a swivel-mounted permanently installed wrench handle 77 so that it will always be available for readjustment of the seat. This is convenient when the bicycle is used by different persons, for example, when a pair takes turns riding it as a relay team in a bicycle race or in cross-country relay type of race. It also enables ready adjustment by any user. The handle 77 is supported by a pivot pin 78 and a pair of cams 79. It is preferably cammed so that it can be locked in position to prevent loose movement.

The assembly 70 may have a tube 80 of a composite construction, having a thin metal cylindrical shell 81 fitted with a honeycomb structure or a closed-cell structural foam 82 or with wood. All of these give excellent results.

The clamp member 40a and the cap 30a are nearly the same as the member 40 and cap 30 of FIGS. 1-4, but instead of the treatment to provide a high friction surface, they are provided with axially-extending splines 85 and 86. Instead of this, a set screw arrangement could be used.

THE SEAT POST ASSEMBLY 100 OF FIGS. 6 AND 7

Figure 6:
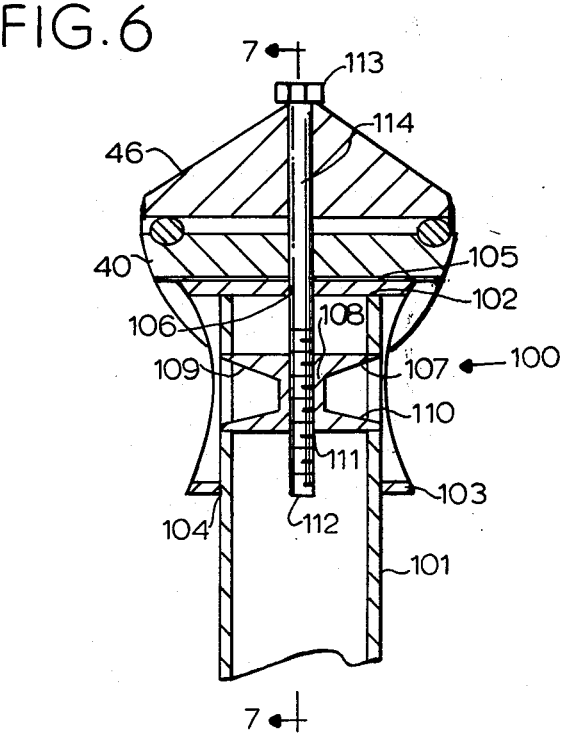
FIG. 6 is a view similar to FIG. 2 of another modified form of the invention, taken along the line 6—6 in FIG. 7.
Figure 7:
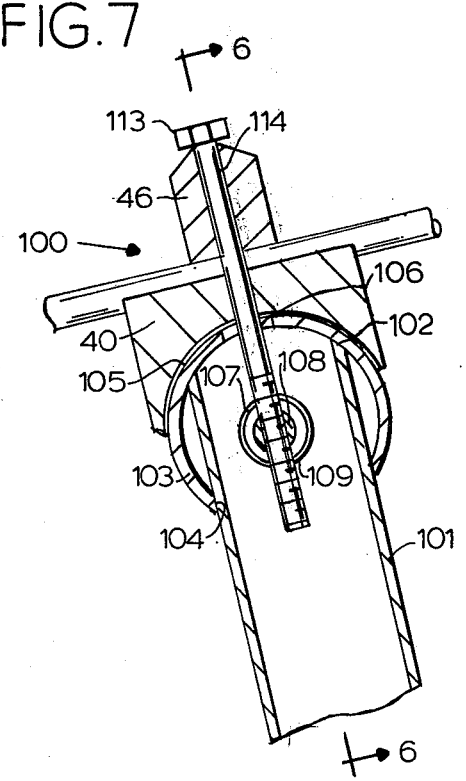
FIG. 7 is a view in section taken along the line 7—7 in FIG. 6.

FIGS. 6 and 7 show an assembly 100 in which the tube 101 has its upper end 102 cut off as an arc and a cap 103 is joined directly to it, either as a weldment or joined by suitable low temperature filler material. In this case there is no offsetting and the cap 103 is a generally cylindrical piece of tubing having a radial opening 104 thereof. The cap 103 is thus automatically provided with a cylindrical upper surface 105, and this surface 105 is then provided with a slot 106 at its upper end. In order to employ this type of structure, the wall of the tube 101 is drilled through to provide a transverse cylindrical inner surface 107 and an appropriately shaped swivel pin 108 is provided, with outer portions 109 and 110 engaging the tube 101 to provide the concentric swivel. In this instance, there is the disadvantage that the swivel pin 108 must have a threaded opening 111 therethrough and that the single bolt 112 must be inserted from above, with its head 113 at the top. However, by locating it properly, it is possible to apply a wrench from the rear of the saddle to engage the head. This construction, however, does have the advantage of using less material and so being lighter in weight. Otherwise, the clamp members 40 and 46 are as in FIGS. 1-4 except for the fact that the opening 114 through the upper clamp member 46 is a through opening and is not threaded.

THE MODIFIED SEAT POST ASSEMBLY 120 OF FIG. 8

Figure 8:
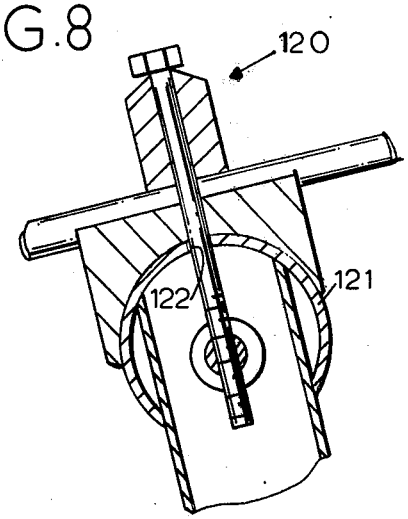
FIG. 8 is a view similar to FIG. 7 of yet another modified form of the invention.

The seat post assembly 120 of FIG. 8 is like that of FIGS. 6 and 7 except that (1) its cap 121 is only a tube segment, not a complete tube and (2) there is no slot but only a bolt-size opening 122 through the cap 121. This is used only where the saddle is to be set at one angle. It contains most of the other advantages except that of angular adjustment.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A bicycle seat post for supporting a saddle on a bicycle frame having a post-receiving socket and means for securing said post to said socket at any of a variety of heights, said saddle having rigid support means thereon with upper and lower surfaces, including in combination:
   a tube having a tube cap secured to its upper end, said cap providing a transversely-extending cylindrical-segment upper surface of uniform shape extending the full width of said cap, and also providing a cylindrical inner surface concentric with said upper surface of the cap, and a centrally located through passage extending upwardly through the radial center line of said surfaces,
   a cylindrical swivel pin rotatably supported by said inner surface so as to be rotatable about its axis and having a smooth diametric bolt opening therethrough aligned with said passage,
   a lower clamp member having an upper surface in engagement with the lower surface of said saddle's rigid support means and having a lower cylindrical-segment surface of approximately the same radius as and in engagement with the full width of said cylindrical-segment upper surface of said tube-cap and having a centrally located bolt-receiving opening therethrough from its lower surface to its upper surface, aligned with said passage,
   an upper clamp member having a lower surface in engagement with an upper surface of said saddle's rigid support means, and having a generally vertical threaded opening aligned with said passage, and
   a bolt slidable through said diametric opening through said swivel pin, through said passage, through said bolt-receiving opening of said lower clamp member, and threadable into said generally vertical opening of said upper clamp member, and
   means for tightening said bolt so as to secure said cap means, said swivel pin, and said clamp members together and to clamp said clamp members to said saddle's rigid support means.

2. The seat post of claim 1 wherein one of the two said cylindrical surfaces at the upper end of said cap and the lower end of said lower clamp member is coated and bonded to an abrasive surface to provide a high-friction, non-slip surface between those two surfaces.

3. The seat post of claim 1 wherein said cylindrical surfaces at the upper end of said cap and the lower end of said lower clamp member are provided with interengaging spline means.

4. The seat post of claim 1 wherein said cap comprises a tubular segment joined to said tube and axially in line therewith.

5. A bicycle seat post for supporting a saddle on a bicycle frame having a post-receiving socket and means for securing said post to said socket at any of a variety of heights, said saddle having a pair of spaced-apart rigid rails for support, said rails having straight portions where the rails are parallel to each other, including in combination:
   a cylindrical tube,
   a tube cap secured to the upper end of said tube and having a portion offset from said tube that provides a transversely extending cylindrical-segment upper surface of uniform shape extending the full width of said cap, said offset portion also having a cylindrical inner surface concentric with said upper surface, and a circumferentially-extending slot extending upwardly through the center of said surfaces,
   a cylindrical swivel pin rotatably supported by said inner surface so as to be rotatable about its axis and having a smooth diametric bolt opening therethrough in alignment with said slot,
   a lower clamp member having an upper surface provided with two linear rail-receiving recesses in engagement with the lower surface of said saddle support rails and having a lower cylindrical-segment surface of substantially the same radius as and in engagement with the full width of said upper surface of said tube cap and having a centrally located bolt-receiving opening therethrough from its lower surface to its upper surface and in alignment with said slot,
   an upper clamp member having a flat lower surface in engagement with the upper surface of said saddle support rails and having a threaded bolt-engaging, generally vertical opening thereinto in alignment with the opening through the lower clamp member, and
   a bolt with its head accessible from below slidably extending up from the bottom of said offset portion of said tube cap, through said smooth diametric opening through sais swivel pin, through said slot, through said bolt-receiving opening of said lower clamp member, and threadably into said bolt-engaging opening of said upper clamp member, said bolt tightening said cap, said pin, and said clamp members together and to said saddle support rails.

6. The seat post of claim 5 wherein said lower surface of said lower clamp member comprises abrasive bonded thereto to provide a high-friction surface.

7. The seat post of claim 5 wherein said bolt is a cam-action threaded springless quill with a quick release, comprising a bearing portion bearing against said swivel pin and a cam having a pivoted handle for acting through said cam to retract and advance said bearing portion for rapid adjustment of said lower clamp member relative to said cap.

8. The seat post of claim 5 wherein the radius of the lower surface of said lower clamp member is slightly smaller than the radius of the upper surface of said cap.

9. A bicycle seat post for supporting a saddle on a bicycle frame having a post-receiving socket and means for securing said post to said socket at any of a variety of heights, said saddle having rigid support means thereon with upper and lower surfaces, including in combination:
- a tube,
- a tube cap on the upper end of said tube for providing a transversely-extending cylindrical-segment upper surface overlying said tube, said tube being drilled to provide a generally cylindrical inner surface concentric with said upper surface, a centrally located through passage extending through said tube and upwardly through the center line of said upper surface,
- a cylindrical swivel pin in engagement with said inner surface and having a diametric threaded opening therethrough aligned with said passage,
- a lower clamp member having an upper surface in engagement with the lower surface of said saddle's rigid support means and having a lower cylindrical-segment surface of substantially the same radius as and in engagement with said upper surface of said tube cap means and having a centrally located bolt-receiving opening therethrough from its lower surface to its upper surface, aligned with said passage.
- an upper clamp member having a lower surface in engagement with an upper surface of said saddle's rigid support means, and having a generally vertical bolt-receiving opening thereinto, aligned with said passage, and
- a bolt extending down through said upper and lower clamp members and threaded into said swivel pin, said bolt tightening said cap means, said pin, and said clamp members together and clamping said clamp members to said saddle's rigid support means.

10. The seat post of claim 9 wherein said tube cap is a complete tube having a transverse opening for reception of said tube.

11. The seat post of claim 9 wherein said through passage comprises a circumferentially-extending arcuate slot through said tube cap.

12. The seat post of claim 9 wherein said upper surface of said lower clamp member and said lower surface of said upper clamp member each have two linear recesses for engagement with the rigid support means of said saddle.

* * * * *